(12) United States Patent
Kwak

(10) Patent No.: US 10,771,246 B2
(45) Date of Patent: *Sep. 8, 2020

(54) SYSTEMS AND METHODS FOR STABLE PHYSICALLY UNCLONABLE FUNCTIONS

(71) Applicant: Maxim Integrated Products, Inc., San Jose, CA (US)

(72) Inventor: Sung Ung Kwak, Frisco, TX (US)

(73) Assignee: Maxim Integrated Products, Inc., San Jose, CA (US)

( * ) Notice: Subject to any disclaimer, the term of this patent is extended or adjusted under 35 U.S.C. 154(b) by 158 days.

This patent is subject to a terminal disclaimer.

(21) Appl. No.: 15/264,872

(22) Filed: Sep. 14, 2016

(65) Prior Publication Data

US 2018/0159685 A1 Jun. 7, 2018

Related U.S. Application Data

(60) Provisional application No. 62/240,991, filed on Oct. 13, 2015.

(51) Int. Cl.
*H04L 9/08* (2006.01)
*H04L 9/32* (2006.01)

(52) U.S. Cl.
CPC .......... *H04L 9/0869* (2013.01); *H04L 9/3278* (2013.01)

(58) Field of Classification Search
CPC ............................ H04L 9/0869; H04L 9/3278
See application file for complete search history.

(56) References Cited

U.S. PATENT DOCUMENTS

| 9,048,834 | B2 | 6/2015 | Li et al. |
| 9,088,278 | B2 | 7/2015 | Pfeiffer et al. |
| 9,485,094 | B1 * | 11/2016 | Parvarandeh ......... H04L 9/0866 |
| 9,502,356 | B1 * | 11/2016 | Parvarandeh ......... H01L 23/544 |
| 9,621,359 | B2 * | 4/2017 | Tremlet ................ H04L 9/3278 |
| 9,705,501 | B2 * | 7/2017 | Muchsel .......... H03K 19/00315 |
| 2004/0252831 | A1 * | 12/2004 | Uehara ................. H04L 9/0631 |
| | | | 380/44 |
| 2012/0183135 | A1 * | 7/2012 | Paral ..................... H04L 9/0866 |
| | | | 380/44 |

OTHER PUBLICATIONS

Souri et al., "A CMOS Temperature Sensor With a Voltage-Calibrated Inaccuracy of ±0.15° C. (3O) From −55° C. to 125° C.," IEEE Journal of Solid-State Circuits, 48(1)292-301, Jan. 2013.

* cited by examiner

*Primary Examiner* — Khalil Naghdali
(74) *Attorney, Agent, or Firm* — North Weber and Baugh LLP

(57) ABSTRACT

Systems and methods allow to take advantage of the natural statistical variation of physical properties in a semiconductor device in order to create truly random, repeatable, and hard to detect cryptographic bits. This may be accomplished by recursively pairing mismatch values of Physically Unclonable Functions (PUF) elements so as to ensure that generated PUF key bits remain insensitive to environmental errors, without affecting the utilization rate of available PUF elements. The pairing process may be applied to any given hardware to generate more stable PUF bit sequences that provide a higher margin of error, increase the number of bits for a given margin of error, or any combination thereof.

18 Claims, 9 Drawing Sheets

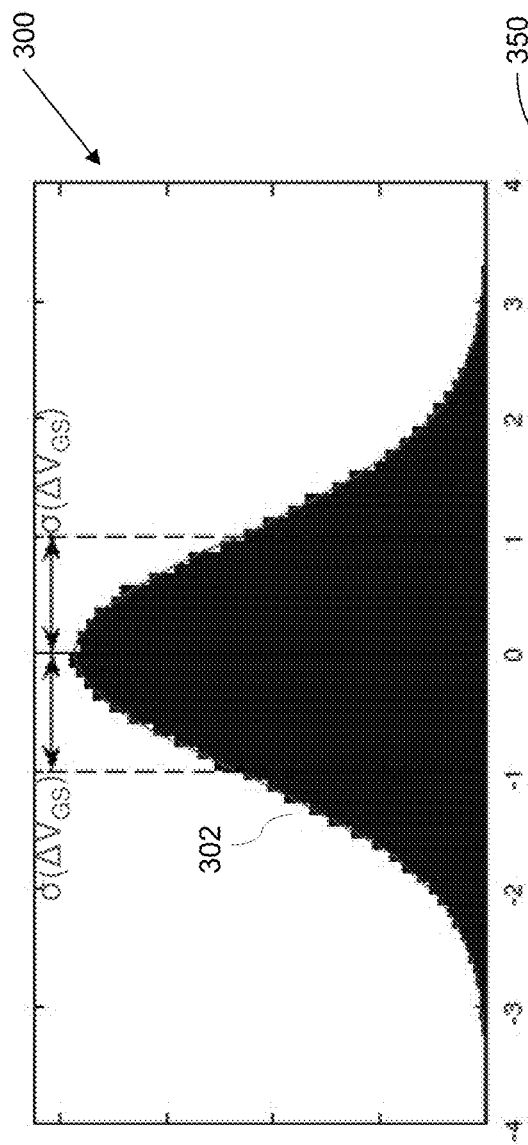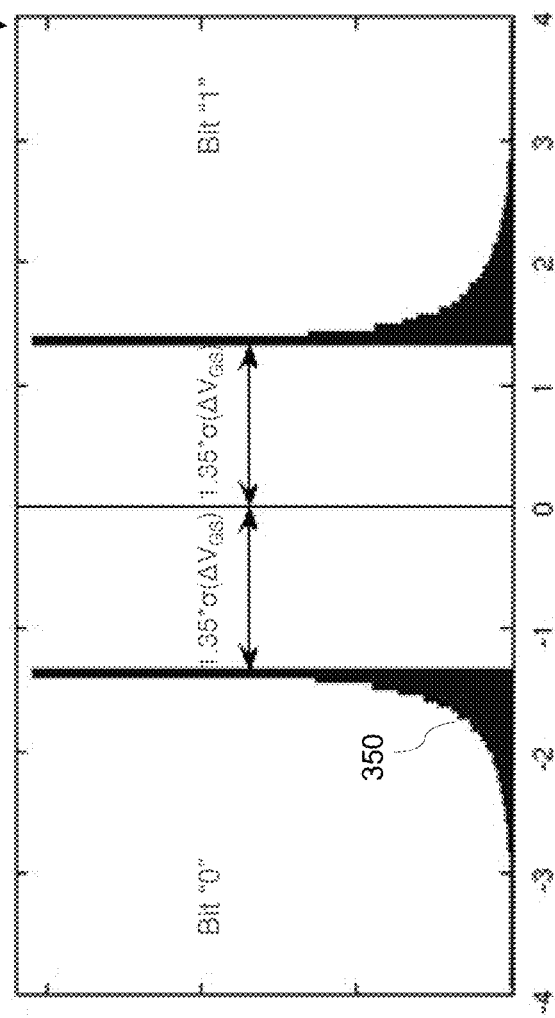
FIGURE 3A
FIGURE 3B

| | 1 ppm | 100 ppb | 10 ppb | 1 ppb |
|---|---|---|---|---|
| 128 bits | 1.65 | 1.80 | 1.90 | 2.00 |
| 256 bits | 1.70 | 1.85 | 1.95 | 2.05 |

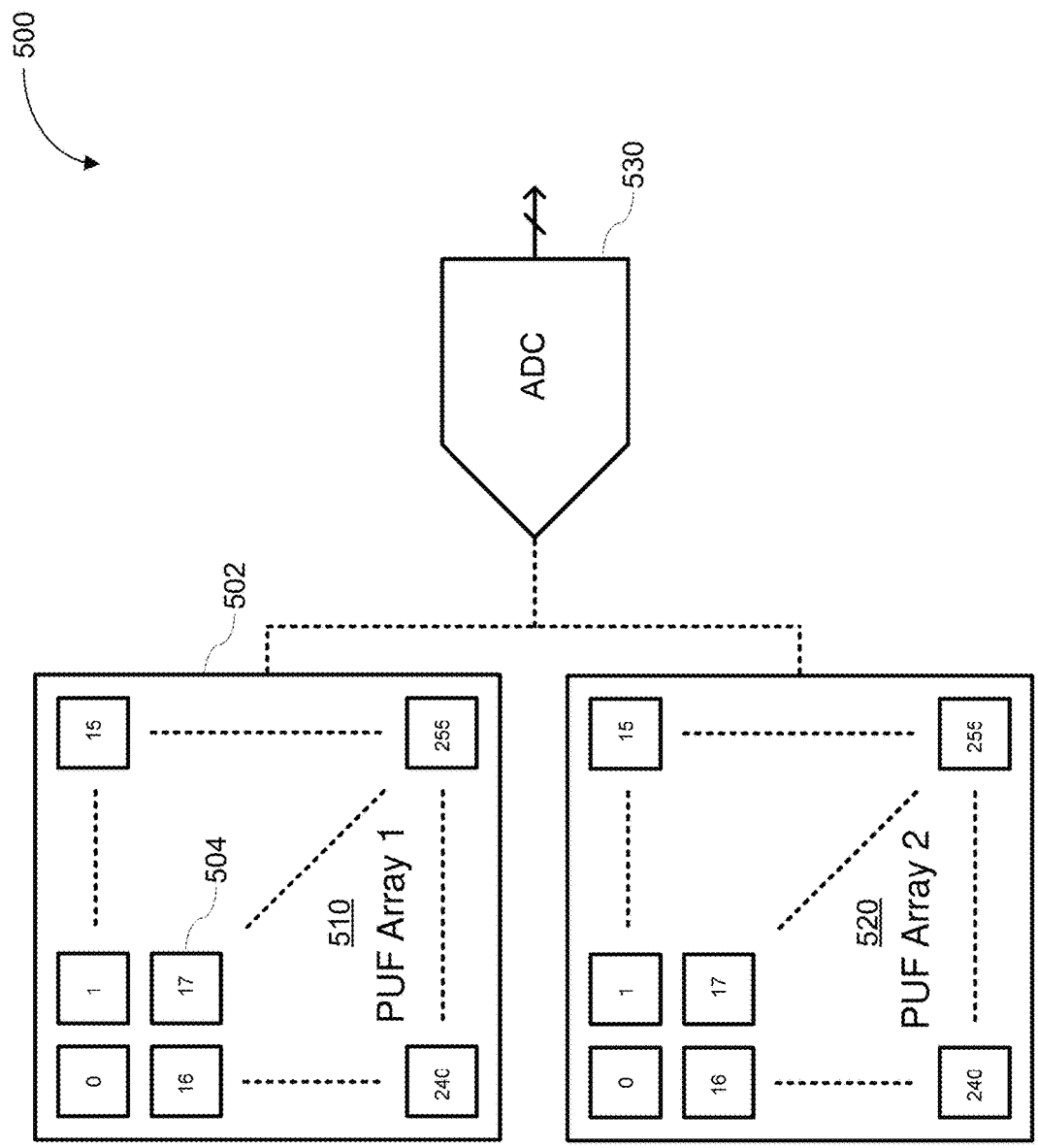

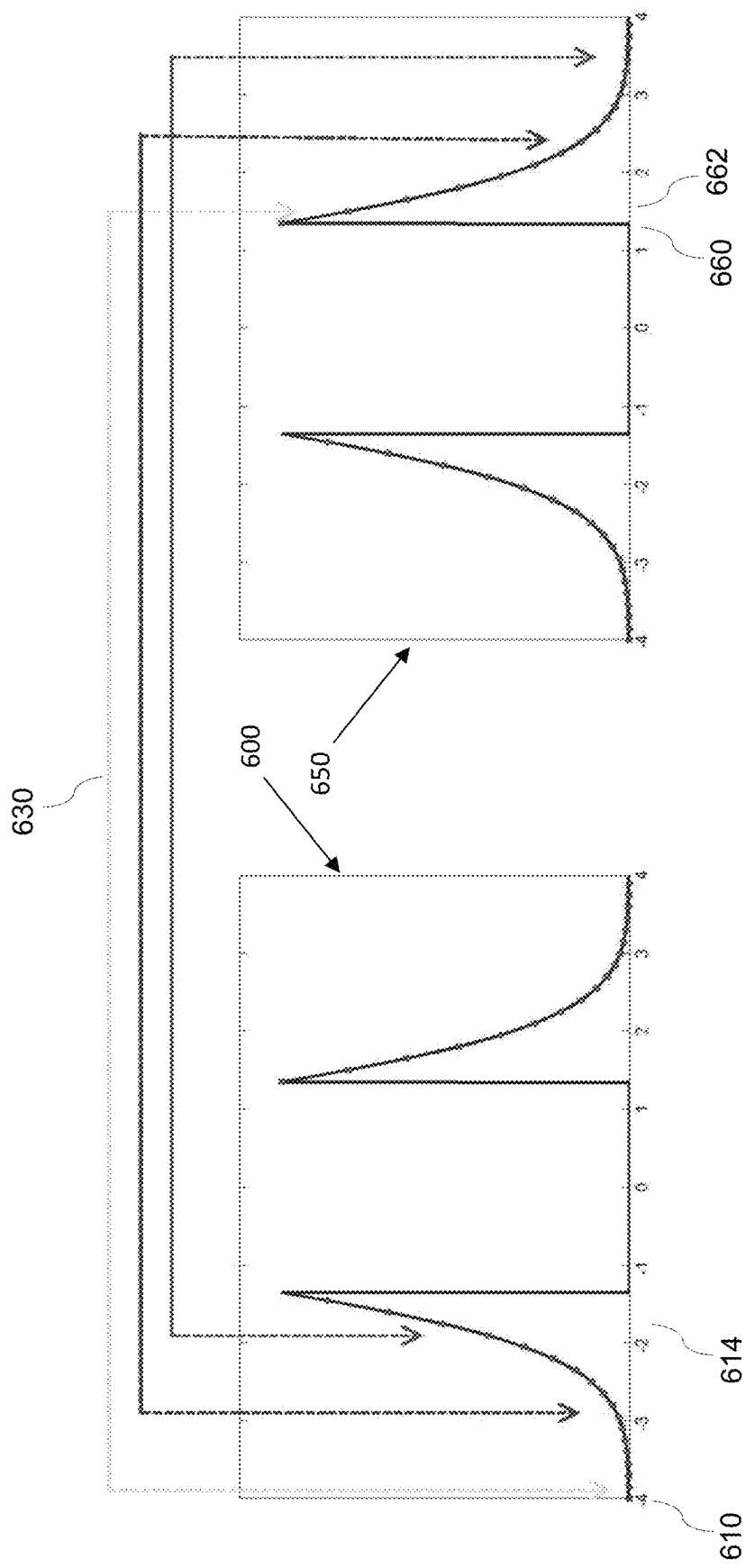

| # OF ARRAYS (N) | MARGIN ($\sigma(\Delta V_{GS})$) | STD. DEVIATION OF TOTAL DRIFT ($\sigma(\Delta V_{GS})$) | PART FAILURE RATE (ppm) FOR 128 BIT KEY |
|---|---|---|---|
| 1 | 1.35 | 0.31 | 350 |
| 2 | 2.93 | 0.438 | 0.4e-3 |
| 4 | 6.12 | 0.62 | trivial |
| 8 | 12.5 | 0.877 | trivial |

FIGURE 8

SYSTEMS AND METHODS FOR STABLE PHYSICALLY UNCLONABLE FUNCTIONS

CROSS REFERENCE TO RELATED PATENT APPLICATIONS

This application claims priority to U.S. Provisional Application No. 62/240,991, entitled "Systems and Methods for Stable Physically Unclonable Functions," and filed Oct. 13, 2015, by Sung Ung Kwak, which application is herein incorporated herein by reference in its entirety.

BACKGROUND

A. Technical Field

The present invention relates to secure systems for identification and authentication and, more particularly, to systems, devices, and methods for random encryption key generation with Physically Unclonable Functions (PUFs).

B. Background of the Invention

Semiconductor processing is aimed at minimizing process variations that are responsible for tolerances generated in physical components on a wafer that result in variations in threshold values of transistors, capacitances, resistance values, etc. By virtue of the manufacturing techniques employed, including non-uniform deposition and etching processes, whose repeatability remains imperfect, variations between components cannot be completely eliminated. The statistical nature of these variations is accompanied by an inability to obtain information about the components merely by inspecting the component layout. In other words, absent extremely difficult measurements at the component level, these physical variations cannot be detected or copied.

PUF design takes advantage of these small but characteristic manufacturing variations in physical semiconductor components in order to generate sequences of random, unique cryptographic keys. In some existing designs, individual key bits are determined based on a mismatch in polarity of PUF elements to generate single bit results. In a typical Gaussian distribution of mismatch, a relatively large number of the population of PUF elements will be centered around the midpoint of the distribution. Given the influence of other non-manufacturing variations, such as voltage shifts, temperature drift, relative aging processes, package stress, noise, etc., the use of commonly employed Zero-One comparators leaves open the possibility that a key bit undesirably changes from a zero value to a one and vice versa based on the polarity of a single PUF element, thereby, negatively affecting the repeatability of a stored code.

Ideally, PUF elements are made of circuit components that exhibit a large mismatch so as to minimize the effect of environmental changes on the device to improve repeatability and stability of the generated key bits. Since the part of the population of PUF elements that exhibits relatively little mismatch is statistically more likely to experience a change in sign, PUF elements that fall within that population are not suitable for the purpose of generating random key bits. Therefore, PUF elements that exhibit relatively little mismatch are typically excluded from any given batch in order to prevent PUF output bit responses that would be sensitive to environmental changes and result in unstable crypto keys.

Unfortunately, techniques that increase stability by selecting PUF elements based on the polarity of the mismatch tend to discard a significant portion of useful PUF elements from the population in order to achieve a desired bit error rate. However, excluding a large portion of PUF elements necessarily lowers the overall utilization rate.

What is needed are tools for secure computing system designers to maintain a high utilization rate of PUF elements without negatively impacting stability and accuracy of key bits generated by electronic PUF systems.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that this is not intended to limit the scope of the invention to these particular embodiments.

FIGS. 3A and 3B illustrate a transformation of an exemplary measured and normalized Gaussian distribution of Vgs mismatch in MOS devices into an exemplary bi-modal distribution of paired mismatch data using sorting, according to various embodiments of the invention.

FIG. 5 illustrates an exemplary implementation of a system to generate a stable 128 bit PUF key by using recursive pairing, according to various embodiments of the invention.

FIGS. 6A and 6B illustrate an exemplary recursive pairing of two bi-modal distributions of paired mismatch data that result from transformations of Gaussian distributions, according to various embodiments of the invention.

FIG. 8 shows exemplary expected error rates of PUF arrays when used according to various embodiments of the invention.

DETAILED DESCRIPTION OF THE PREFERRED EMBODIMENTS

In the following description, for the purpose of explanation, specific details are set forth in order to provide an understanding of the invention. It will be apparent, however, to one skilled in the art that the invention can be practiced without these details. One skilled in the art will recognize that embodiments of the present invention, described below, may be performed in a variety of ways and using a variety of means. Those skilled in the art will also recognize that additional modifications, applications, and embodiments are within the scope thereof, as are additional fields in which the invention may provide utility. Accordingly, the embodiments described below are illustrative of specific embodiments of the invention and are meant to avoid obscuring the invention.

Reference in the specification to "one embodiment" or "an embodiment" means that a particular feature, structure, characteristic, or function described in connection with the embodiment is included in at least one embodiment of the invention. The appearance of the phrase "in one embodiment," "in an embodiment," or the like in various places in the specification are not necessarily referring to the same embodiment.

Furthermore, connections between components or between method steps in the figures are not restricted to connections that are affected directly. Instead, connections illustrated in the figures between components or method steps may be modified or otherwise changed through the addition thereto of intermediary components or method steps, without departing from the teachings of the present invention.

In this document the terms "variation" and "mismatch" are used interchangeably. "PUF elements" and "PUF devices" include physical, chemical, and other elements recognized by one of skilled in the art.

Figure 1:
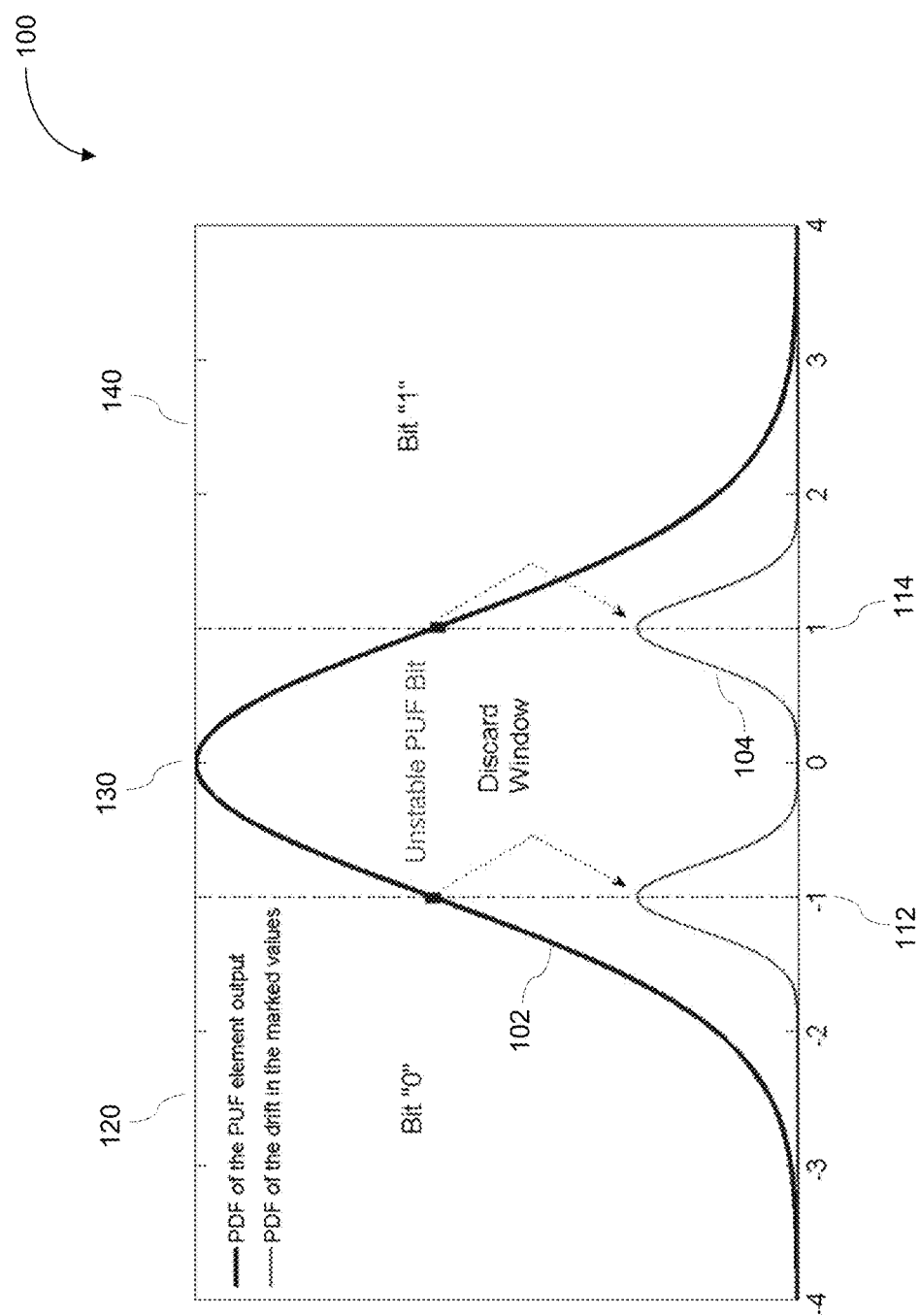
FIG. 1 illustrates the effect of drift on a normalized Gaussian distribution of PUF element outputs representing mismatch values.

FIG. 1 illustrates the effect of drift on a normalized Gaussian distribution of PUF element outputs representing mismatch values. Mismatch in PUF elements may be caused by a number of factors, including variations in doping concentrations, gate oxide thickness, and tolerances in geometry that result from imperfect semiconductor manufacturing processes during the manufacturing of the MOS devices. Mismatch information of PUF elements existing in physical device may be obtained in various forms, such as the form of electrical, magnetical, or optical information.

In general, PUF bits are selected from a given population of mismatch values (e.g., threshold voltages) of measured PUF elements based on the polarity. In FIG. 1 PUF elements with small mismatch values are typically discarded to ensure stability and prevent drift from causing an unwanted flipping of bits. Drift, as used herein, maybe any change in environmental variables, such as temperature drift, noise, and the like. As a result, much of the useful PUF elements in a distribution are typically discarded in favor of achieving the desired stability. In detail, the upper curve in FIG. 1 is a mismatch distribution, whereas the lower curve is showing distribution of the drift of any given mismatch. This information may be derived from measurements on PUF elements.

Let us consider a PUF element with a mismatch located at the +1σ 112 or −1σ 114 points on distribution 102 location, then a mismatch value located in region 120 on the left or negative side of the distribution can be considered sufficiently large to ensure a bit "0." Likewise, a mismatch value located in region 140 on the right or positive side of the distribution can be considered sufficiently large to ensure a bit "1." However, the value of a mismatch located in the mid-section 130 of distribution 102 is likely to heavily vary if affected by one or more environmental variables, as shown by curve 104.

Since the skirt of curve 104 is relatively closer to the center of the distribution, this increases the likelihood of an unwanted PUF key bit flip. For example, if any mismatch values outside of the +/−1σ band 130 is considered stable, all PUF elements associated with values under curve 102 falling within the +/−1σ window 130, i.e., 68% of the population of the Gaussian distribution 102 will have to be discarded. It is noted that other distributions cannot eliminate the problem as they produce similar comparable results. Advantageously, the methods and systems presented herein are independent of the type of specific statistical distribution of any sampled group of actual components.

In short, in order to achieve a desired bit error rate, e.g., to allow for operation within a wider temperature range, a relatively large fraction of useful PUF elements must be discarded from the overall population 102 to account for potential drift and ensure stable PUF bits. However, the improvement in error rate comes at the expense of a reduction in the number of usable PUF elements that are capable of generating PUF bits. Intuitively, the more PUF elements located close to the center of the distribution are used, the smaller will be their mismatch and the more unrepeatable PUF bits will be included in the selection, resulting in a larger error rate.

Therefore, it would be desirable to have systems and methods to avoid this trade-off between utilization and error rate such that generated PUF key bits remain insensitive to environmental errors without affecting the overall utilization rate of available PUF elements.

Figure 2:
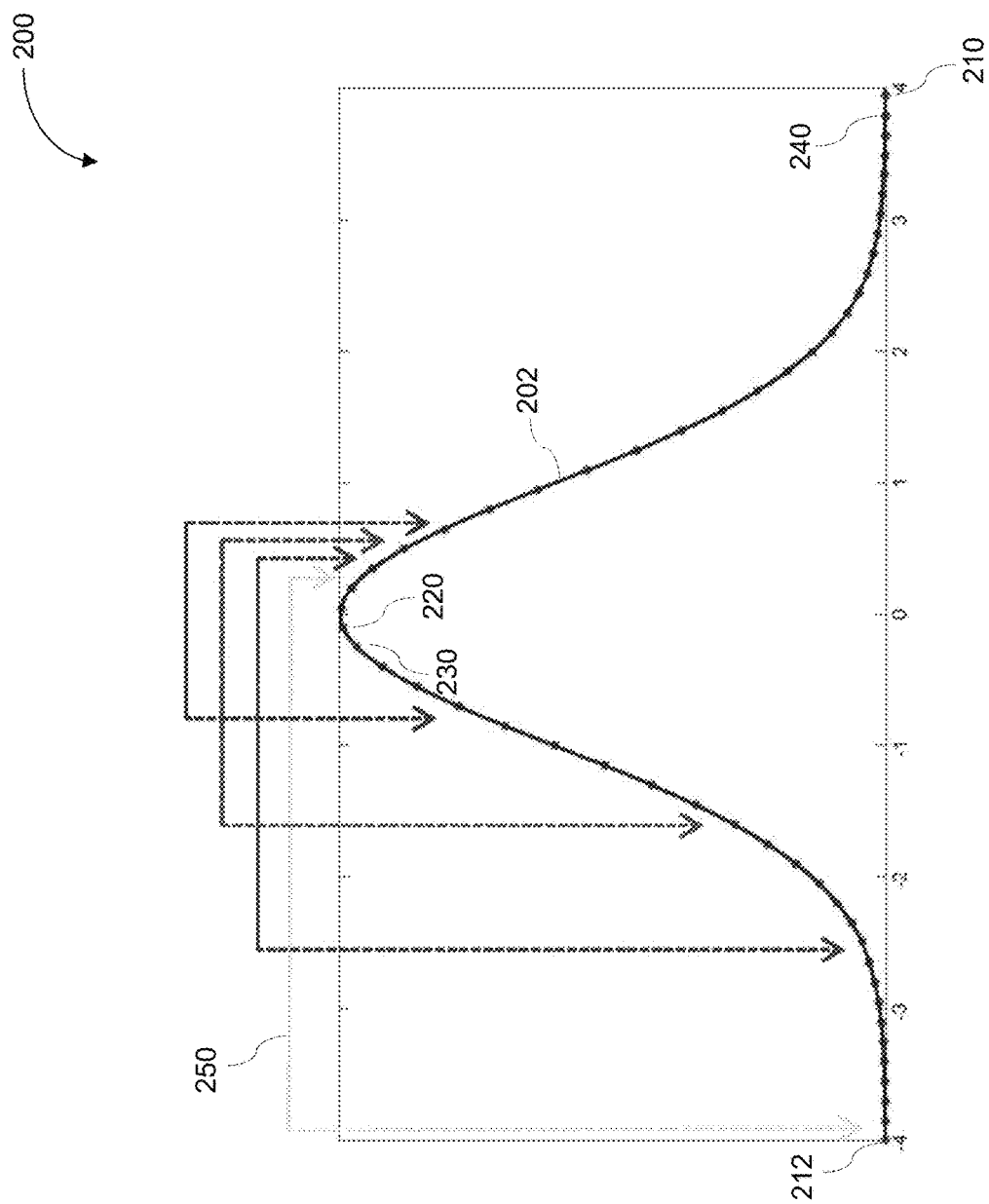
FIG. 2 illustrates an exemplary pairing process for generating PUF key bits using an exemplary Gaussian distribution of sorted mismatch values, according to various embodiments of the invention.

FIG. 2 illustrates an exemplary pairing process for generating PUF key bits using an exemplary Gaussian distribution of sorted, raw PUF element mismatch data, according to various embodiments of the invention. Gaussian distribution 202 comprises 256 measured mismatch values of a 16×16 bit array of 256 PUF elements (not shown). Each PUF element is associated with its own mismatch value that is output by the PUF element array. In embodiments, the 256 mismatch values representing 256 measured samples are sorted by magnitude and polarity and combined to pairs in order to create random values from differences in the mismatch values in a pair 250.

In detail, the rightmost value in example in FIG. 2 is the first PUF element 210, and the leftmost value is the $256^{th}$ PUF element 212. According to the distribution, the first 210 and $256^{th}$ 212 PUF element each have a relatively large mismatch value with opposite polarity. In contrast, the $129^{th}$ PUF element 220 has a mismatch value of about zero. It is understood that by this sorting method—assuming a sufficiently large population of mismatch values—about half of the values obtained will be positive, while the other half will be negative.

In embodiments, once the mismatch values for the PUF elements are sorted form 1 to n (here n=256), they are paired in the following manner: The PUF element with the most positive mismatch, i.e., the first PUF element 210 on the far right positive side of distribution 202, is paired with the PUF element with the least negative mismatch on the negative side close to the center region of distribution 202, i.e., the 129th PUF element 220 to construct the first paired value. Next, the second most positive PUF element, i.e., the second PUF element 240, is paired with the second least negative PUF element 230, i.e., the 130th PUF element, so as to obtain the second paired result, and so on.

This paring method (called non-recursive herein) continues until all 256 mismatch values in distribution 202 are paired. This results in the generation of a total number of 128 random paired values. The pairing information is different from part to part. Since the measured data are unique to each part, this approach desensitizes the PUF key bits to the variations over different parts, wafers, lots or packages, etc.

In mathematical form, for n elements, paring is performed for i=1 to n, by pairing the $i^{th}$ element with the $(n/2+i)^{th}$ element. In embodiments, the pairing of mismatch values comprises a subtraction on pairs of mismatch values, such that the combination of a relatively large number with smaller number into a pair creates 128 random and relatively large difference values. In embodiments, a selection circuit (not shown) may be implemented to select and quantify differences in mismatch values between pairs of devices, e.g., by assigning a numerical value to the difference between each pair.

In embodiments, to maintain the randomness of key bit generation in addition to maintaining stability, the value obtained from the subtraction is randomly switched to generate the random 0 or 1 value. This may be accomplished, for example, by randomly subtracting the two numbers in the pair from each other, i.e., by randomly selecting the minuend and subtrahend prior to performing the subtraction operation.

Assuming a 1-to-256 index that represents the physical placement of the mismatches of the physical PUF elements, once sorted, the index will be different from the original index. In one embodiment, prior to subtraction, each element is assigned an index number based on location, and if the first index number is greater than the second, the first number is selected as the minuend. Conversely, if the first index number is less than the second, the first number is selected as subtrahend. In other words, the selection of the minuend is also based on the mismatch of the particular chip as represented by the index number, thereby, taking advantage of the randomness characteristic of the PUF itself and preventing an unwanted contamination of the randomness. One skilled in the art will appreciate that other mapping and sorting schemes may be utilized.

FIGS. 3A and 3B illustrate a transformation of an exemplary measured and normalized Gaussian distribution of mismatch values into an exemplary bi-modal distribution, according to various embodiments of the invention. Mismatch is typically represented by a number, e.g., a voltage difference $\Delta V_{GS}$. In embodiments, the pairing of identified or measured and sorted elements transforms the histogram of the original Gaussian distribution 302 of Vgs mismatch in MOS devices into bi-modal distribution 350 comprising paired mismatch data. Each sample in bi-modal distribution 350 is derived from a set of paired mismatch data points in distribution 302. As a result, the generation of, e.g., a 128 bit PUF key requires 256 PUF elements that sample 256 mismatch data points, because two elements that are paired are combined to generate a single PUF bit.

Graph 300 in FIG. 3A is the original Gaussian distribution 302 of mismatch prior to pairing. Mismatch distribution 302 may be obtained from measurements, e.g., made at ambient temperature at wafer sort. Graph 350 in FIG. 3B shows the bi-modal distribution 350 having an increased margin of at least 1.35 times the standard deviation of distribution 302. In embodiments, once pairing is accomplished, the two numbers in each pair are subtracted from each other in order to generate a relatively large difference value. For example, if the subtraction produces in a positive number, the resulting bit will be assigned a value of "1," whereas, if the subtraction results in a negative number, the bit will be assigned a value of "0." By virtue of the subtraction operation, the large difference value widens the safety margin and, thus, ensures that the result is not affected by the effects of drift.

The effect of combining paired PUF elements in this manner is to convert the Normal distribution 302 of the Vgs mismatch into a bi-modal distribution 350 that contains no Vgs values within an exclusion range located around the center of distribution 350. This satisfies the criterion for a minimum separation of pairs of PUF elements intended to ensure the generation of stable PUF bits due to an improved expected error rate, as will be discussed next.

Figure 4:
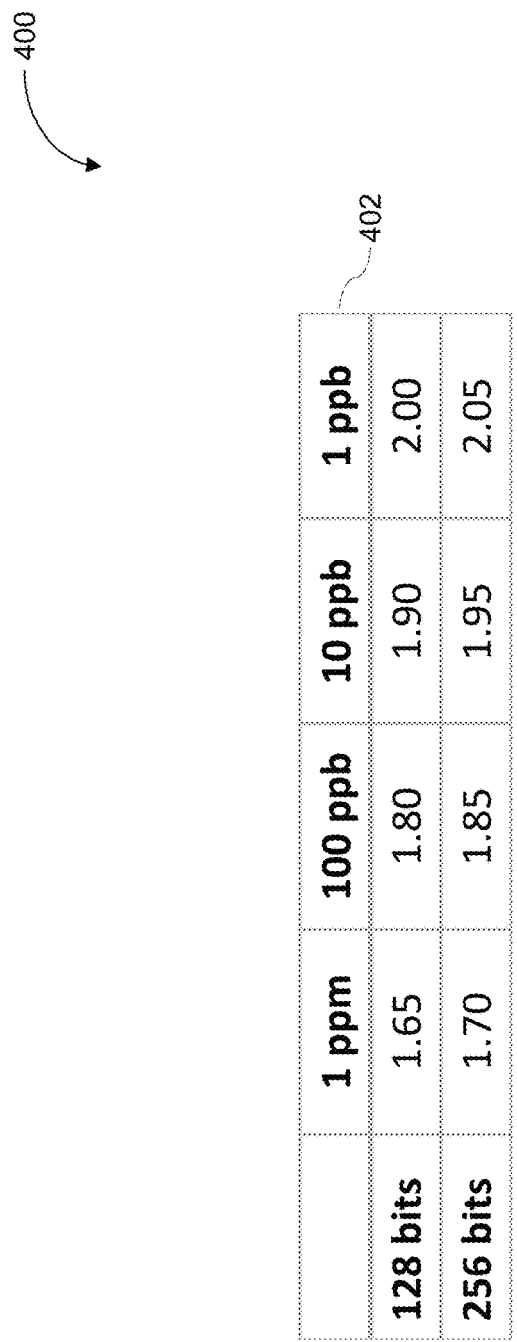
FIG. 4 illustrates expected margins as a function error rates, according to various embodiments of the invention.

FIG. 4 illustrates expected margins as a function error rates, according to various embodiments of the invention. Ideally, the error rate, i.e., the probability of misreading a single bit that is caused by a change in polarity, for example due to environmental effects, would be zero. Empirical data, however, suggests that the failure rate for a 128 bit key is 350 parts per million (ppm). Similarly, for a 256 bit key, the failure rate is found to be 650 ppm. And, in some applications, the 1.35σ separation for a typical failure rate of a 128 bit key may still not provide an adequate margin.

For example, as shown in FIG. 4, a tenfold lower failure rate 402 from 1 ppm to 100 parts per billion (ppb) for a 128 bit key requires an increase in separation by 0.15 standard deviations, here, from 1.65 to 1.8. A one hundredfold lower failure rate from 1 ppm to 10 ppb for the same 128 bit key requires an increase in separation by 0.25 standard deviations, and so on. It is noted that a 100% utilization of PUF elements is not required for purposes of the invention. Advantageously, systematic errors do not affect the outcome, as these errors are inherent to the entire system and apply equally to all mismatch pairs. Errors caused by noise are also negligible when compared with the magnitude of the differences being detected.

In embodiments, in order to increase stability even further than by the pairing scheme discussed with respect to FIG. 2 and FIG. 3, pairing of analog PUF elements is performed in a recursive manner, as will be explained with reference to FIG. 5, which illustrates an exemplary implementation of a system to generate a stable 128 bit PUF key by using recursive pairing, according to various embodiments of the invention. System 500 comprises chips 502, 504, and ADC 530. A person skilled in the art will appreciate that system 500 may comprise additional components that analyze, convert, amplify, process, and secure data, including logic devices and power sources known in the art.

The inventors envision that mismatch values are processed by any mathematical operation, e.g., by multiplication instead of a simple subtraction. In addition, any number of mismatch values may be selected and combined for processing. For example, three mismatch values may be processes to generate a PUF key. In addition, different algorithms may be used on different physical devices in order to decrease detectability and, thus, enhance security.

Chips 502, 504 comprise two identical but independent 16×16 PUF arrays 510, 520 that may be used to generate two independent bi-modal distributions shown in FIGS. 6A and 6B. As depicted therein, the separation of paired mismatch elements in FIGS. 6A and 6B is +/−1.35σ, i.e., the same value as in FIG. 3 that was obtained by the pairing process discussed with respect to FIGS. 2 and 3.

Returning to FIG. 5, each PUF array 510, 520 is designed to pair elements 504 as previously described. While only two arrays are shown in FIG. 5, the inventor envisions that any number of possible arrays and any combination may be used. In embodiments, once PUF elements 504 are sorted for each array form one to n (e.g., n=256), they are paired in the following manner:

The most positive mismatch from one bi-modal distribution (e.g., number 1 of array 1 510) is paired with the least negative mismatch from the other bi-modal distribution (e.g., number 65 of array 2 520) to obtain the first recursively paired result. The second most positive mismatch from the first bi-modal distribution (e.g., number 2 of array 1 510) is paired with the least negative mismatch from the second bi-modal distribution (e.g., number 66 of array 2 520) until all 128 paired values are re-paired. In other words, for n elements 504, paring is performed for i=1 to n/2, by pairing the $i^{th}$ element of array 1 with the $(i+n/2)^{th}$ element of array 2, and for i=n/2+1 to n by pairing the $i^{th}$ element of array 1 with the $(i-n/2)^{th}$ element of array 2.

This method provides two elements for each bi-modal distribution, i.e., four elements from which 0 and 1 key bits may be generated. In embodiments, similar to FIG. 2, the paired values are subtracted and random switching is applied to generate values of either 0 or 1, for example, by assign a 0 or 1 value based on an index, as before. However, compared the non-recursive method of FIG. 2, the recursive method is expected to yield relatively larger separations, i.e., margins.

In embodiments, the separation for the recursive method is a least twice as large as for the non-recursive method. For example, as can be seen in FIGS. 6A and 6B, the pairing of a mismatch associated with a σ of −4 610 with a mismatch associated with a σ of +1.35 660 results in a relatively wide total separation margin of 5.35, which is almost four times larger than 1.35 for that particular pair 630. Even when taking into account the non-linear nature of bi-modal distributions 600, 650 and examining mismatch values located rather in the middle of the distributions representing a medium point in density, pairing a mismatch associated with a σ of −1.46 614 from bi-modal distribution 600 with a mismatch associated with a σ of about +1.46 662 bi-modal distribution 650 would result in a total separation margin of about 2.93, which is more than two times of separation of 2.7 that can be obtained from the non-recursive method. Therefore, even the smallest available separation will still be two times greater than 1.35 for any given pair.

One advantage of recursive pairing in accordance with the embodiments of the invention is that the methods may be iteratively used on any given hardware to selectively generate more stable PUF bits or increase the number of bits.

Figure 7A:
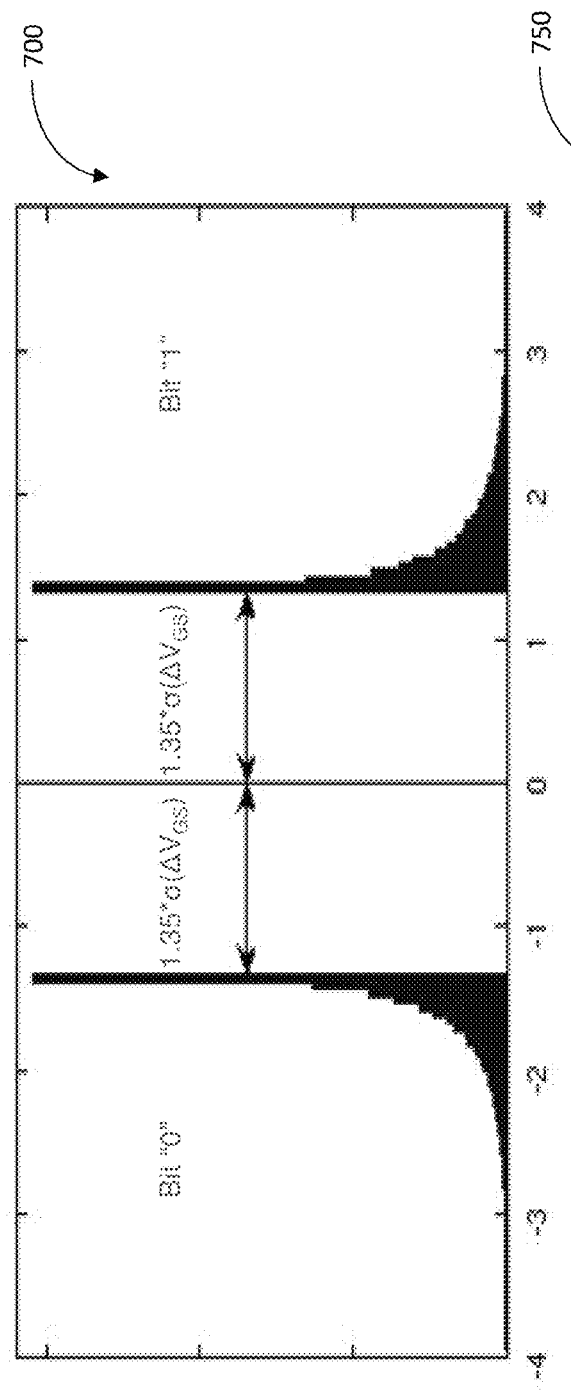
FIGS. 7A and 7B illustrate the effect of the recursive pairing in FIG. 6.
Figure 7B:
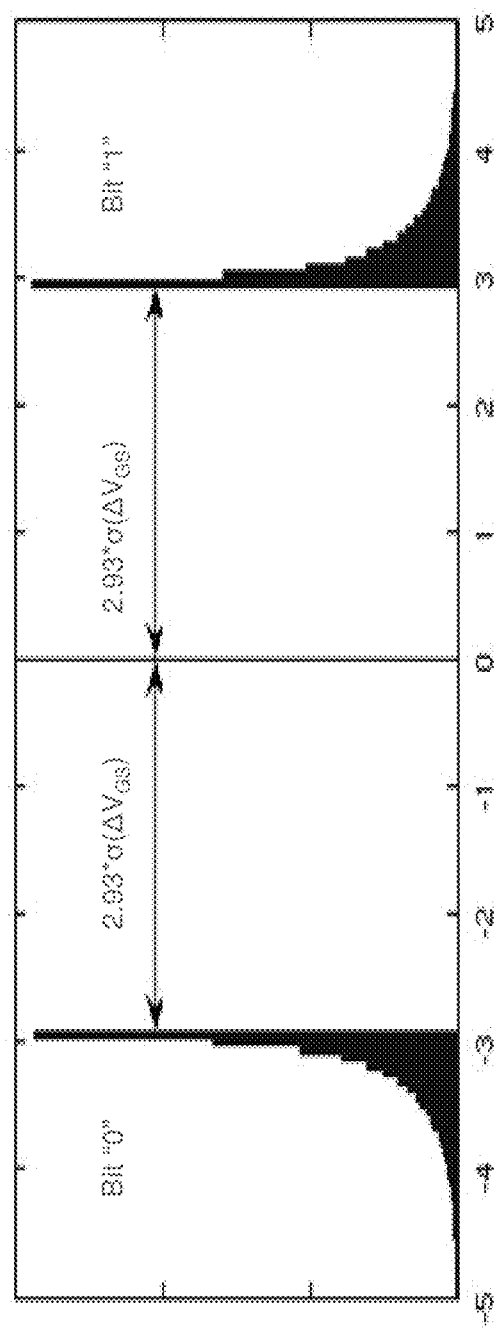

FIGS. 7A and 7B illustrate the effects of the recursive pairing in FIG. 6. FIG. 7A shows the same a bi-modal distribution 700 as in FIG. 3B that results from the non-recursive pairing when applied to a Gaussian distribution. In contrast, bi-modal distribution 750 in FIG. 7B illustrates a result that is obtained by using the system presented in FIG. 5 that applies recursive pairing. As can be seen, the random values in distribution 750 in FIG. 7B are also distributed in to a bi-modal fashion. However, the increased separation distance advantageously provides for a larger margin. Comparing empirical data from the two different pairing methods, it can be seen that the separation increases from 1.35 for non-recursive pairing in FIG. 7A to 2.93 for the recursive paring method in FIG. 7B. In other words, the separation distance more than doubles. As a result, e.g., for a 128 bit key, a failure rate of 0.4 ppb may be achieved using the recursive paring method.

FIG. 8 shows exemplary expected error rates of PUF arrays when used according to various embodiments of the invention. Numeral N in table 800 indicates the number of exemplary 16×16 arrays used to perform non-recursive pairing, i.e., N=1, or recursive pairing, i.e., N>1, according to the embodiments of the invention. While up to 8 arrays are listed in FIG. 8, one of skill in the art will appreciate that the number of possible arrays and their combinations thereof is unlimited. Margin 810, expressed in units of σ(ΔV$_{GS}$), represents the achievable separation based on the given number of arrays 810. Standard deviation of total drift 820 is based on empirical data and is also expressed in units of σ(ΔV$_{GS}$). The value to part failure rate 830 is based on empirical data for an exemplary 128 bit key.

As FIG. 8 illustrates, when recursive pairing is extended to include multiple PUF arrays, margin 810 more than doubles each time the number of arrays 802 is doubled. This result translates directly into enhanced PUF stability and accuracy without the need for more accurate measurements. Additionally, as the number of arrays 802 doubles, the standard deviation of total drift 820 is increased by a factor of √2, and part failure rate 830 decreases accordingly, further highlighting the benefits of this highly scalable model that is based on a modular PUF array design that requires minimal or no design changes to add arrays to improve stability.

In embodiments, some or all of the functions of the modular system may be implemented in software. One having skill in the art will appreciate that accuracy may be traded for longer key length. For example, more arrays may be added to increase the key bit length from, e.g., 128 to 256, at a constant separation. Alternatively, the bit length may be kept constant in favor of increasing the separation distance to achieve a greater margin for purposes of PUF stability and accuracy.

It is understood that the various embodiments of the invention can be applied to any physical property with a natural variation, such as threshold voltage, oscillation frequency, resistance, capacitance, etc. In one embodiment, different characteristics of element pairs are combined to create the mathematical operation (e.g., Vt mismatch and capacitance mismatch). Further, one skilled in the art will appreciate that various memory structures can be used to store the pairing information.

Figure 9:
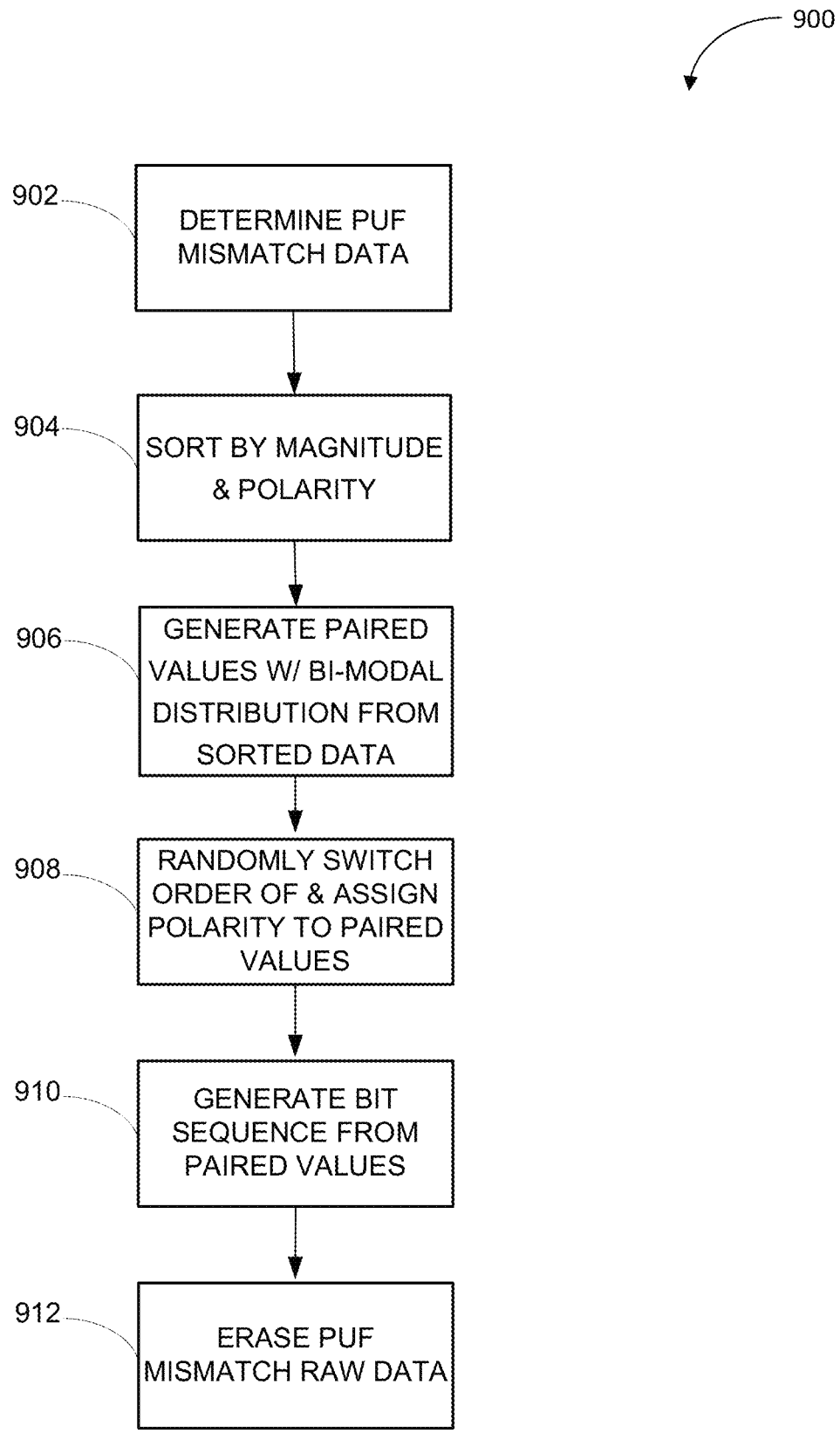
FIG. 9 is a flowchart of an illustrative process to generate pairing information according to various embodiments of the invention.

FIG. 9 is a flowchart of an illustrative process to generate pairing information, according to various embodiments of the invention. The process for generating pairing information starts at 902, "when" mismatch data is determined for two to a plurality of PUF elements.

At step 904, the mismatch data is sorted by magnitude and polarity to obtain the group of sorted mismatch data having a certain mathematical distribution.

At step 906, pairs of data are selected from the group of sorted mismatch data according to some selection mechanism so as to generate a bi-modal data distribution consisting of paired values. In embodiments, pairs may be selected from one or more bi-modal distributions that are generated by one or more PUF arrays. In embodiments, individual values of a pair may be subtracted from each other to increase a separation distance between them.

At step 908, individual values of a pair are randomly switched, and a polarity is assigned to the paired value to maintain randomness.

At step 910, the bit sequence is generated from the paired values using the bi-modal distribution data.

Finally, at step 912, the raw PUF path mismatch data is the erased from memory.

It will be appreciated by those skilled in the art that fewer or additional steps may be incorporated with the steps illustrated herein without departing from the scope of the invention. No particular order is implied by the arrangement of blocks within the flowchart or the description herein.

It will be further appreciated that the preceding examples and embodiments are exemplary and are for the purposes of clarity and understanding and not limiting to the scope of the present invention. It is intended that all permutations, enhancements, equivalents, combinations, and improvements thereto that are apparent to those skilled in the art, upon a reading of the specification and a study of the drawings, are included within the scope of the present invention. It is therefore intended that the claims include all such modifications, permutations, and equivalents as fall within the true spirit and scope of the present invention.

The invention claimed is:

1. An apparatus to generate Physically Unclonable Function (PUF) key bits, the apparatus comprising:
   a sensing element configured to detect mismatches in physical characteristics between PUF elements and to output signals associated with the mismatches;

a data converter coupled to the sense element, the data converter converts the output signals into mismatch data being associated with a first distribution;

a sorting module coupled to receive the mismatch data from the data converter, the selection module sorts at least some of the mismatch data by magnitude and polarity to generate sorted mismatch values;

a paring module to pair at least two sorted mismatch values to generate a paired value that is associated with a second distribution; and a sequence generator that generates a bit sequence using the paired value, wherein the paired value is generated by combining a first sorted mismatch value associated with a large positive number with a second sorted mismatch value associated with a relatively smaller negative number, the paired value.

2. The apparatus according to claim 1, wherein the paring module pairs sorted mismatch values to generate a first paired value that is associated with a second distribution, a second paired value that is associated with a third distribution, and uses the first and second paired values to generate a fourth distribution.

3. The apparatus according to claim 1, further comprising a switching module to switch an order of at least some of the sorted mismatch values to assign to the paired value a polarity that represents one of a zero and a 1.

4. The apparatus according to claim 1, wherein a difference between two paired values is equal to or exceeds predetermined value.

5. The apparatus according to claim 1, wherein the plurality of PUF elements are located on independent arrays.

6. The apparatus according to claim 5, wherein the first sorted mismatch value is associated with a first array and the second sorted mismatch value is associated with a second array.

7. The apparatus according to claim 1, wherein the mismatch data is stored in a first memory and overwritten when a second memory stores the paired data.

8. The apparatus according to claim 7, wherein the first memory comprises a register that receives the mismatch data.

9. The apparatus according to claim 1, wherein at least one of the sorting module and the paring module is implemented in software.

10. The apparatus according to claim 1, wherein the sensing element detects mismatches at a start-up condition.

11. The apparatus according to claim 1, wherein the data converter digitizes the mismatch data prior to sorting a pairing.

12. The apparatus according to claim 9, wherein switching module comprises a summation module that subtracts the switched sorted mismatch values based on the output signals.

13. A method of reliably reproducing randomly generated unique bit sequences, the method comprising:
    determining mismatch data related to at least one physical characteristic of a plurality of Physically Unclonable Function (PUF) elements, the mismatch data being associated with a first distribution;
    sorting at least some of the mismatch data by magnitude and polarity to generate sorted mismatch values;
    pairing sorted mismatch values to generate a paired value that is associated with a second distribution; and
    generating a bit sequence using the paired value, wherein the paired value is generated by combining a first sorted mismatch value associated with a large positive number with a second sorted mismatch value associated with a relatively smaller negative number, the paired value.

14. The method according to claim 13, wherein the first sorted mismatch value is associated with a first array and the second sorted mismatch value is associated with a second array, the first and second array being independent from each other.

15. The method according to claim 13, further comprising switching an order of at least some of the sorted mismatch values to assign a polarity to the paired value, the polarity represents one of a zero and a 1.

16. The method according to claim 13, wherein the first distribution is a normal distribution and the second distribution is a bi-modal distribution.

17. A method of reliably reproducing randomly generated unique bit sequences, the method comprising:
    determining mismatch data related to at least one physical characteristic of a plurality of Physically Unclonable Function (PUF) elements, the mismatch data being associated with a first distribution;
    sorting at least some of the mismatch data by magnitude and polarity to generate sorted mismatch values;
    pairing sorted mismatch values to generate a first paired value that is associated with a second distribution and a second paired value that is associated with a third distribution;
    pairing the first and second paired values to generate a fourth distribution; and
    generating a bit sequence using the first and second paired values.

18. The method according to claim 17, wherein a first separation of the fourth distribution is at least twice as large as a second separation of the first distribution.

* * * * *